C. H. WITTHOEFFT.
APPARATUS FOR MOLDING CONCRETE STAIRCASES.
APPLICATION FILED NOV. 17, 1910.
1,041,551.
Patented Oct. 15, 1912.
2 SHEETS—SHEET 1.
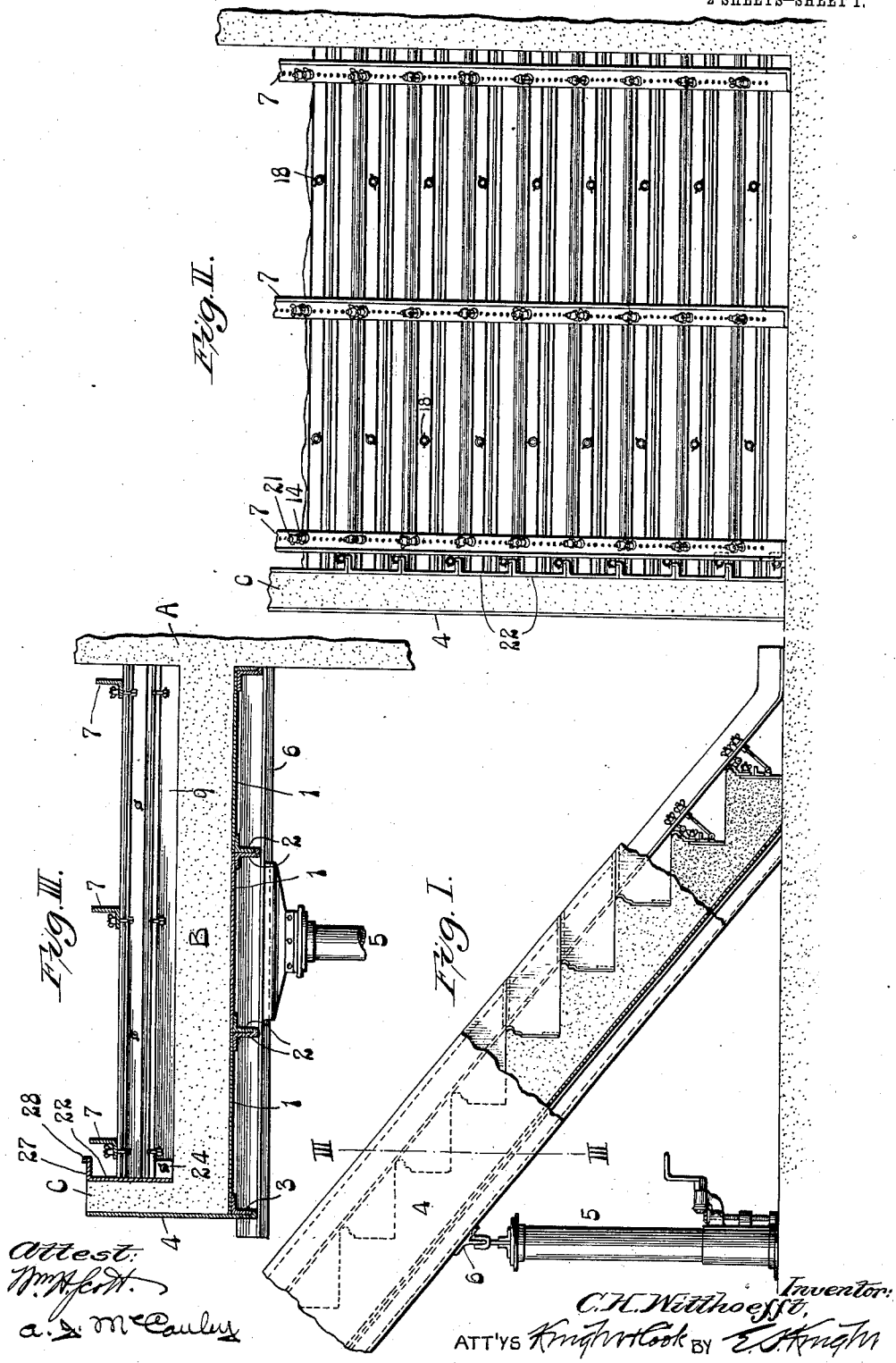

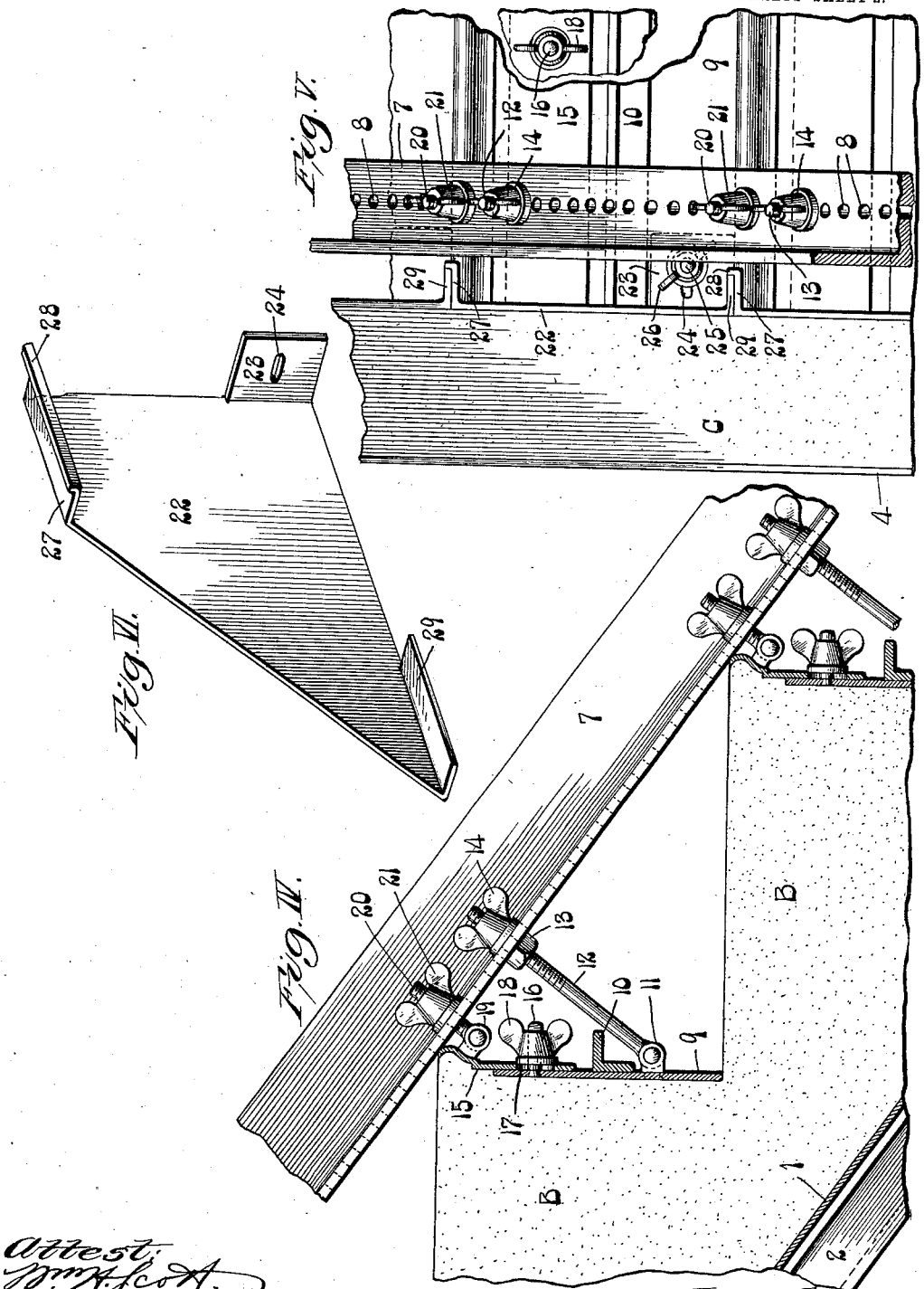

UNITED STATES PATENT OFFICE.

CHARLES H. WITTHOEFFT, OF ST. LOUIS, MISSOURI, ASSIGNOR TO WITTHOEFFT COLLAPSIBLE CONCRETE FORMS COMPANY, OF ST. LOUIS, MISSOURI, A CORPORATION OF MISSOURI.

APPARATUS FOR MOLDING CONCRETE STAIRCASES.

1,041,551.   Specification of Letters Patent.   Patented Oct. 15, 1912.

Application filed November 17, 1910. Serial No. 592,791.

*To all whom it may concern:*

Be it known that I, CHARLES H. WITTHOEFFT, a citizen of the United States of America, residing at St. Louis, in the State of Missouri, have invented certain new and useful Improvements in Apparatus for Molding Concrete Staircases, of which the following is a full, clear, and exact description, reference being had to the accompanying drawings, forming part of this specification.

My invention relates to an apparatus for use in molding staircases of concrete, the object of the invention being to provide a simple and efficient molding apparatus of this kind which may be quickly mounted in position for service and quickly dismantled after the staircase has been formed; and further to provide a staircase molding apparatus by which the steps and adjacent members of the staircase are accurately molded.

Figure I is a view partly in elevation and partly in section of my molding apparatus as it appears when a staircase is being molded therein. Fig. II is a front elevation. Fig. III is a vertical cross section taken on line III—III, Fig. I. Fig. IV is an enlarged vertical longitudinal section through molded steps and the step molding members. Fig. V is an enlarged front elevation of portions of the step and side railing molding members. Fig. VI is an enlarged perspective view of one of the railing molding plates.

In the accompanying drawings: 1 designates the bottom mold plates of my staircase molding apparatus, these plates being arranged in series extending upwardly at inclines from a floor line according to the inclination it may be desired to give to the staircase. The plates have secured to them at their adjoining edges reinforcing bars 2 that serve as stiffeners for the plates and also as means for holding them assembled, in which latter connection it should be stated that the bars 2 on adjoining plates are secured to each other in any suitable manner. The bars are shown in the drawings as being of angle shape and they preferably receive suitable clips which straddle them. The bottom plate 1 farthest removed from a building wall, as seen at A, (see Fig. III), is provided with a reinforcing bar 3 located at its outer edge.

4 is a vertical side plate located adjacent to the outermost bottom plate 1 and which may extend the full length of the staircase. This side plate is adapted to be secured to the reinforcing bar 3 and it has for its function the office of providing an outer mold member for the outer face of a vertical railing C that projects upwardly from the outer ends of the concrete steps B when they are molded in the use of my apparatus.

The bottom mold plates 1 and the parts associated therewith, as described, are designed to be supported in their proper positions by any desirable number of jacks 5, (see Figs. I and III.) These jacks may be of any usual construction and inasmuch as no invention is herein claimed for them, it is deemed unnecessary to describe the jacks. In order that the jacks may perform their functions in supporting my molding apparatus and the concrete staircase molded thereby until the concrete in such staircase has become set, I provide cross bars 6 which extend transversely beneath the bottom mold plates 1 and their reinforcing bars, and to which the jacks are applied.

7 designates the top bars of my molding apparatus which extend parallel with the bottom mold plates 1, and are maintained at an elevation thereabove according to the heights of the steps that are to be molded in the use of the apparatus. There are preferably three of these bars used in molding a staircase of ordinary width, two outer ones and an intermediate one, as shown in the drawings; but it will be obvious upon a complete understanding of my apparatus that the number of top bars may be diminshed or increased according to the width of the staircase to be molded. The top bars are preferably of angle shape in cross section and their lower ends are preferably bent, as seen in Fig. I, in order that they may rest firmly upon the floor at the foot of the molding apparatus. In one flange of each top bar, namely, the flange that is parallel with but in a higher plane than the bottom mold plates, are perforations 8 arranged in close proximity and adapted to receive members to be presently described.

9 designates the main mold plates by which the riser faces of the concrete steps B are molded, each of these plates being preferably provided with a stiffener bar 10, of angle shape in cross section, extending longitudinally thereof. Each riser face molding plate is provided with ears 11 and these ears have pivotally mounted in them setting rods 12 which are screw threaded and extend through perforations 8 in the top bars 7. Upon the setting rods 12 are nuts 13 located beneath the top bars and nuts 14 located above said top bars so that the top bars are clamped between said nuts 13 and 14.

15 designates top mold plates for service in conjunction with the main riser face mold plates. These top mold plates are vertically adjustable relative to the main or lower mold plates 9, the vertical adjustment as shown in the drawings being secured by providing the mold plates 9 with screw threaded studs 16 that extend through slots 17 in the mold plates 15 and have arranged thereon clamping nuts 18 by which the upper mold plates are held in fixed positions. It will be seen that this construction makes it possible to vary the combined height of the riser mold plates 9 and 15 to suit the height of step that is to be produced in the use of the molding plates. The upper mold plates 15 are provided with ears 19 and these ears have pivotally mounted in them screw rods 20 which extend through perforations in the top bars 7, and receive adjusting nuts 21 through the medium of which the upper mold plates may be properly adjusted to suit the adjustment of the lower mold plates 9 effected by the setting rod 12 and the nuts 13 and 14 thereon.

22 designates plates for service in molding the inner face of the side railing C. Each of these plates is beveled at its front end correspondingly to the incline or slope of the railing C, as seen most clearly in Figs. I and VI. The plates have upright rear ends adapted to be positioned against the step riser face mold plates, and each plate is provided with a laterally projecting vertical wing 23 that seats against the corresponding riser face mold plate 9, (see Figs. III and V). These vertical wings contain horizontal slots 24 which receive binder screws 25 attached to the mold plates 9 and equipped with nuts 26 that, by bearing against the wings hold the plates 22 from lateral movement. The provision of the horizontal slots 24 in the wings 23 makes it possible to adjust the plates 22 to a certain degree according to the width of concrete steps it may be desired to produce. Each plate 22 is provided at the top of its rear portion with a ledge 27 having an upright flange 28 at its free edge, and at the bottom of the forward end of each plate is a laterally projecting horizontal wing 29. It will be readily apparent that when the plates 22 are mounted one above another, each plate acts to support the one above it by reason of the horizontal wing 29 of the surmounting plate resting upon the ledge 27 of the lower or supporting plate, and it will be further apparent that the vertical flanges 28 of the ledges act to prevent lateral movement of the forward ends of said plates while their rear ends are firmly held by the binding screws 25 and nuts 26 which exert holding influence upon the vertical wings 23 of the plates.

When my staircase molding apparatus has been assembled, concrete may be readily poured into the mold between the several devices for producing the riser faces of the staircase steps and between the molding members by which the railing C is produced. This concrete would of course be introduced first at the bottom of the apparatus and the introduction continued upwardly therefrom. As the work of molding progresses, the treads of the steps are properly formed by leveling the concrete between the tops of the foremost riser face molding plates and the bottoms of the riser face mold plates immediately back of the top of each riser face mold plate in front of it.

I claim:—

1. In a concrete staircase mold, a foundation device, top bars extending longitudinally of the staircase, and a series of sectional riser mold plates arranged below and supported by said top bars, each of said riser mold plate sections being adjustably connected to the top bars.

2. In a concrete staircase mold, a foundation device, top bars extending longitudinally of the staircase, riser mold plates interposed between the top bars and the foundation device, and setting rods by which said mold plates are adjustably connected to said top bars.

3. In a concrete staircase mold, a foundation device, top bars extending longitudinally of the staircase, riser mold plates interposed between the top bars and the foundation device, and setting rods pivoted to said mold plates and connected to said top bars.

4. In a concrete staircase mold, a foundation device, top bars extending longitudinally of the staircase, sectional riser mold plates interposed between the top bars and the foundation device, setting rods secured to each mold plate independently of setting rods secured to other mold plates, and means whereby said setting rods are adjustably connected to said top bars.

CHAS. H. WITTHOEFFT.

In the presence of—
A. J. McCAULEY,
E. B. LINN.